United States Patent
Garmark et al.

(10) Patent No.: US 9,935,944 B2
(45) Date of Patent: *Apr. 3, 2018

(54) SYSTEMS AND METHODS FOR CONTROLLING A LOCAL APPLICATION THROUGH A WEB PAGE

(71) Applicant: Spotify AB, Stockholm (SE)

(72) Inventors: Sten Garmark, Stockholm (SE); Nicklas Soderlind, Johanneshov (SE); Samuel Cyprian, Stockholm (SE); Aron Levin, Stockholm (SE); Hannes Graah, Stockholm (SE); Erik Hartwig, Stockholm (SE); Gunnar Kreitz, Hagersten (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,982

(22) Filed: Aug. 30, 2016

(65) Prior Publication Data

US 2017/0118192 A1    Apr. 27, 2017

Related U.S. Application Data

(63) Continuation of application No. 14/446,174, filed on Jul. 29, 2014, now Pat. No. 9,438,582, which is a
(Continued)

(51) Int. Cl.
*H04L 29/06* (2006.01)
*G06F 9/54* (2006.01)
(Continued)

(52) U.S. Cl.
CPC .............. *H04L 63/083* (2013.01); *G06F 9/54* (2013.01); *G06F 17/2247* (2013.01);
(Continued)

(58) Field of Classification Search
CPC . H04L 63/08; H04L 63/0823; H04L 63/0807; G06F 17/2247; G06F 21/335
See application file for complete search history.

(56) References Cited

U.S. PATENT DOCUMENTS

| 6,216,101 | B1 | 4/2001 | Butts et al. |
| 7,945,774 | B2 * | 5/2011 | Ganesan ................ H04L 63/06 713/151 |

(Continued)

FOREIGN PATENT DOCUMENTS

| CN | 101296087 A | 10/2008 |
| CN | 101548276 A | 9/2009 |

(Continued)

OTHER PUBLICATIONS

Creating Embedable Widgets, Techfounder, Feb. 5, 2010, 6 pgs.
(Continued)

*Primary Examiner* — Khoi Le
(74) *Attorney, Agent, or Firm* — Morgan, Lewis & Bockius LLP

(57) ABSTRACT

At a client computer, a web browser displays a control for a local utility executed on the client computer, wherein the control includes a link. The web browser receives a user input selecting the control and, in response to the user input, issues a request through the link to a local web server coupled with the local utility. The link includes a domain that resolves to a loopback network address. The loopback network address is a self-referencing address for the local web server at the client computer. The local web server receives the request and provides the local utility with a command portion of the request. In response to receiving the command portion of the request from the local web server, the local utility takes one or more actions based on the command portion of the request.

12 Claims, 11 Drawing Sheets

Related U.S. Application Data continuation of application No. 13/443,781, filed on Apr. 10, 2012, now Pat. No. 8,898,766.

(51) Int. Cl.
*G06F 17/22* (2006.01)
*H04L 29/08* (2006.01)

(52) U.S. Cl.
CPC ...... *H04L 63/0807* (2013.01); *H04L 63/0823* (2013.01); *H04L 67/025* (2013.01); *H04L 67/12* (2013.01)

(56) References Cited

U.S. PATENT DOCUMENTS

| | | | | |
|---|---|---|---|---|
| 8,214,691 | B1* | 7/2012 | Spalink | H04L 43/50 714/28 |
| 8,391,278 | B2* | 3/2013 | Preis | H04Q 3/0025 370/352 |
| 9,001,356 | B2 | 4/2015 | Tsujimoto | |
| 9,032,497 | B2* | 5/2015 | Padala | G06F 21/10 726/10 |
| 9,071,616 | B2* | 6/2015 | Lau | H04L 63/104 |
| 2001/0052016 | A1* | 12/2001 | Skene | G06F 9/505 709/226 |
| 2007/0142944 | A1* | 6/2007 | Goldberg | G10H 1/0025 700/94 |
| 2007/0245310 | A1 | 10/2007 | Rosenstein et al. | |
| 2008/0127323 | A1* | 5/2008 | Soin | G06F 21/31 726/12 |
| 2008/0263650 | A1* | 10/2008 | Kerschbaum | G06F 21/6218 726/9 |
| 2009/0240810 | A1* | 9/2009 | Chang | H04L 63/062 709/226 |
| 2009/0249222 | A1* | 10/2009 | Schmidt | H04N 21/2368 715/751 |
| 2010/0017596 | A1* | 1/2010 | Schertzinger | G06F 21/33 713/155 |
| 2010/0100927 | A1* | 4/2010 | Bhola | G06F 21/335 726/1 |
| 2010/0138485 | A1* | 6/2010 | Chow | G06F 17/30902 709/203 |
| 2010/0162126 | A1* | 6/2010 | Donaldson | G06F 17/30902 715/738 |
| 2010/0284389 | A1* | 11/2010 | Ramsay | G06F 17/30017 370/338 |
| 2011/0246772 | A1* | 10/2011 | O'Connor | H04L 63/0428 713/168 |
| 2011/0302412 | A1* | 12/2011 | Deng | H04L 63/0407 713/159 |
| 2012/0054846 | A1* | 3/2012 | Lightsey | H04L 63/1441 726/9 |
| 2012/0260315 | A1* | 10/2012 | Hidalgo | H04L 63/04 726/4 |
| 2012/0268553 | A1* | 10/2012 | Talukder | H04L 12/1818 348/14.08 |
| 2013/0031462 | A1* | 1/2013 | Calvo | G06F 9/545 715/234 |

FOREIGN PATENT DOCUMENTS

| | | |
|---|---|---|
| CN | 101952823 A | 1/2011 |
| EP | 2141860 A1 | 1/2010 |
| JP | 2001-509286 T | 7/2001 |
| JP | 2008-515293 A | 5/2008 |
| JP | 2011-124652 A | 6/2011 |
| JP | 2011-520324 A | 7/2011 |
| WO | WO 00/60503 | 10/2000 |
| WO | WO2009/054047 | 4/2009 |

OTHER PUBLICATIONS

Cross-origin Resource Sharing, Wikipedia—The Free Encyclopedia, Mar. 16, 2012, 2 pgs.
Cross-site Request Forgery, Wikipedia—The Free Encyclopedia, Mar. 20, 2013, 6 pgs.
Garmark, Office Action, U.S. Appl. No. 13/443,781, dated Mar. 26, 2013, 22 pgs.
Garmark, Office Action, U.S. Appl. No. 13/443,781, dated Oct. 25, 2013, 24 pgs.
Garmark, Notice of Allowance, U.S. Appl. No. 13/443,781, dated Feb. 11, 2014, 15 pgs.
Garmark, Notice of Allowance, U.S. Appl. No. 13/443,781, dated Jun. 4, 2014, 15 pgs.
Garmark, Office Action, U.S. Appl. No. 14/446,174, dated Feb. 18, 2015, 31 pgs.
Garmark, Final Office Action, U.S. Appl. No. 14/446,174, dated Jun. 18, 2015, 35 pgs.
Garmark, Final Office Action, U.S. Appl. No. 14/446,174, dated Nov. 23, 2015, 26 pgs.
Garmark, Notice of Allowance, U.S. Appl. No. 14/446,174, dated May 25, 2016, 13 pgs.
OAuth, Wikipedia—The Free Encyclopedia, Apr. 2, 2013, 5 pgs.
Spotify AB, Notice of Reasons for Rejection, JP2015-505030, dated May 13, 2016, 5 pgs.
Spotify AB, Decision to Grant, JP2015-505030, dated Sep. 5, 2016, 5 pgs.
Spotify AB, International Search Report and Written Opinion, PCT/IB2013/001034, dated Dec. 6, 2013, 8 pgs.
Spotify AB, International Preliminary Report on Patentability, PCT/IB2013/001034, dated Oct. 14, 2014, 5 pgs.
Video Widgets for the Friendster, Facebook, Gala, Tagworld, HiS, IMVU Blog, Dec. 2007, 2 pgs.
XMLHttpRequest, Wikipedia—The Free Encyclopedia, Mar. 28, 2013, 9 pgs.
Spotify AB, First Office Action, CN201380030649.1, dated Jun. 2, 2017, 9 pgs.
Spotify AB, Notice of Reasons for Rejection, JP2016-191153, Nov. 2, 2017, 13 pgs.

\* cited by examiner

SYSTEMS AND METHODS FOR CONTROLLING A LOCAL APPLICATION THROUGH A WEB PAGE

TECHNICAL FIELD

This application is a continuation of U.S. application Ser. No. 14/446,174, filed Jul. 29, 2014 which is a continuation of U.S. application Ser. No. 13/443,781, filed Apr. 10, 2012 (now U.S. Pat. No. 8,898,766), which applications are incorporated by reference herein in their entireties.

BACKGROUND

Modern computers allow users to consume multiple different types of media, including text, still images, video, and audio, in addition to providing other functionalities, such as web browsing. As computers have becoming more interactive and powerful, users are increasingly storing and consuming media directly on their computers. Also, users are spending more and more time online, reading news, web logs (blogs), and online magazines, as well as visiting social networking sites. However, in many computer systems, media playback software, such as a music player, is discrete from web access software, such as a web browser. Accordingly, users are required to switch between the displayed web browser and the music player in order to adjust or change the playback of the music or to view status information of the music player. Having to navigate among different applications, however, can be inefficient and inconvenient.

Currently, it is difficult for a web page to communicate to a locally stored and executed media player (or any other local utility) such that either the local media software or the web page can send information to the other when it is desirable to do so. Accordingly, it would be beneficial to provide systems and methods that solve these and other problems associated with providing communication between a local media player and a web browser.

SUMMARY OF THE INVENTION

Accordingly, there is a need for systems and methods that allow fast, efficient, and secure communications between applications, such as web browsers, and local utilities. In accordance with some embodiments, a method is performed at an electronic device with a processor and memory. The method includes receiving, at a local utility, a first request originating from an application and including a first token. The application received a web page including a plurality of links and the first token from a first server. The plurality of links were received by the application from a second server. The method further includes authenticating the first token, including sending the first token to a third server. The method further includes, in response to authenticating the first token, generating a second token at the local utility. The method further includes sending the second token to the application for inclusion in subsequent requests from the application.

In some embodiments, the method further includes receiving a second request including a third token, and verifying that the third token matches the second token. If the second and third tokens match, the method includes taking one or more actions based on the content of the second request. If the second and third tokens do not match, the method includes taking no action based on the content of the second request.

In some embodiments, authenticating the first token includes sending the first token from the local utility to a third server, and receiving, at the local utility, an authentication message from the third server.

In some embodiments, the application is a web browser, and the local utility is a media player. In some embodiments, the local utility includes a web server that communicates with the local utility and the application (e.g., the web browser). In some embodiments, the plurality of links are included in a module. In some embodiments, the module is an iframe. In some embodiments, the links correspond to local utility control commands and/or local utility status requests. In some embodiments, the links are uniform resource locators (URLs).

In accordance with some embodiments, an electronic device including one or more processors, memory, and one or more programs stored in the memory and configured to be executed by the one or more processors include instructions for performing the operations of any of the methods described above. In accordance with some embodiments, a non-transitory computer readable storage medium has stored therein instructions which, when executed by an electronic device, cause the device to perform the operations of any of the methods described above.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

Figure 1:
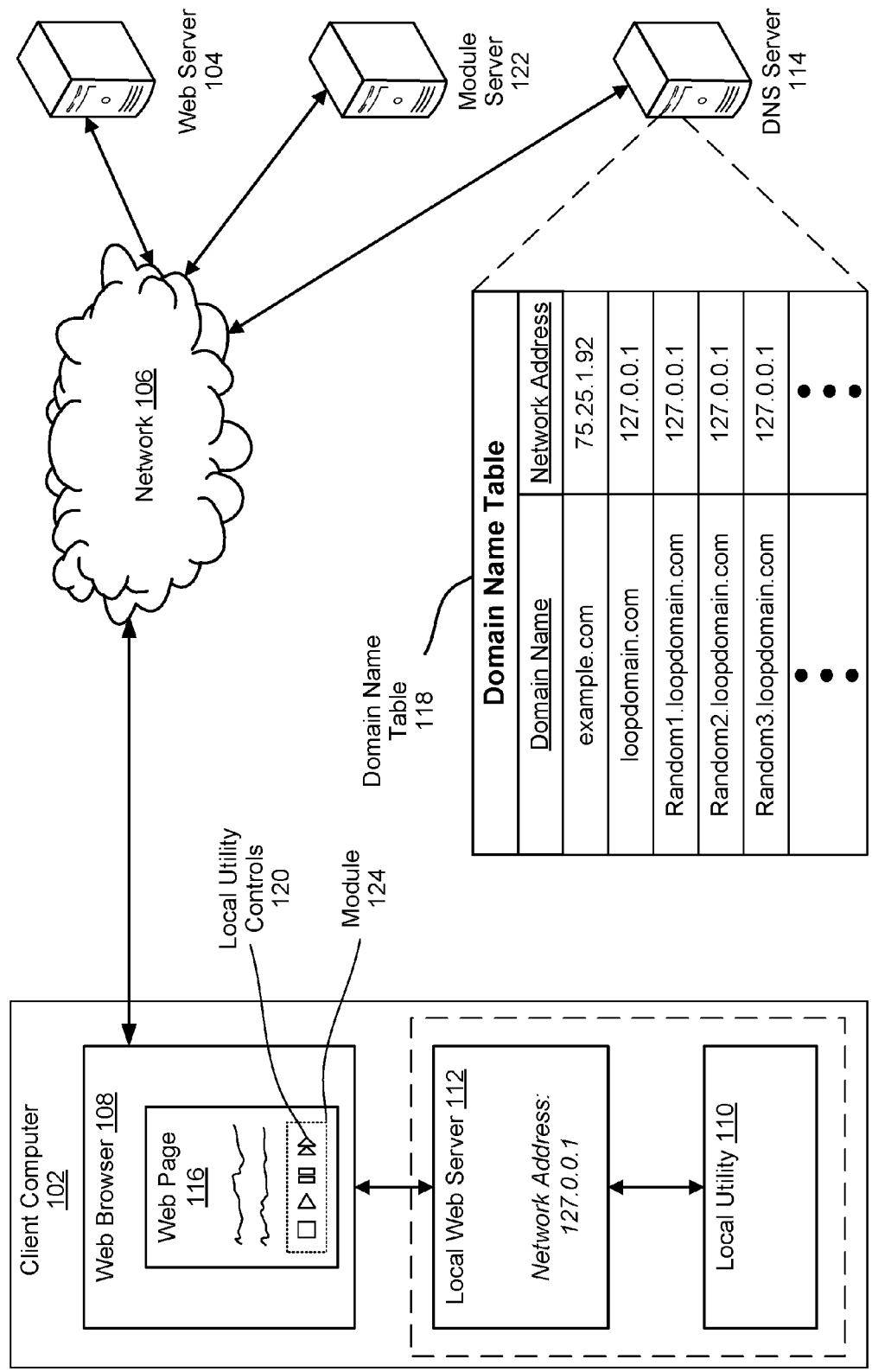
FIG. 1 is a block diagram illustrating a client-server environment, according to some embodiments.

The systems and methods described herein enable bidirectional and continuous communication between two applications that are executed at a client computer. In particular, the disclosed embodiments enable a user to control and interact with certain aspects of locally executed utilities (such as media players, download managers, camera control applications, photo/video editors, etc.) through controls that are included in web pages displayed in a local application, such as a web browser. The systems and methods described herein also provide a way to create modules that include control elements for local utilities (such as control buttons, status windows, etc.) for inclusion in web pages.

While web pages used to offer only limited functions (such as simple text and image display), they are now capable of performing functions that were previously provided by dedicated, locally stored and executed software. For example, web pages can now allow a user to stream music to their computer, or take control of a local webcam to take videos or photographs. However, while such functions may be provided by browser-based solutions (e.g., plug-ins such as JAVA™, QUICKTIME™, FLASH™, and the like), locally stored and executed software is still often more effective or convenient than browser-based solutions. For example, media player applications are often most effective when they have direct access to and control over a computer's local file structure, so that they can access, analyze, organize, and playback stored media files quickly and efficiently.

Moreover, locally stored and executed applications may provide additional services or functions that are difficult to implement with browser-based solutions. For example, a local media player may be configured to automatically post status updates identifying recently played songs to a social networking site. In another example, a local media player may track a user's media consumption history so that a media service associated with the media player can provide suggestions of new media items that are relevant to the user's tastes. In some cases, it is difficult to implement these features in a web page or with browser plug-ins. Moreover, if a local utility already exists that performs these functions, it may be more efficient to use the local utility than attempt to recreate them in a web browser environment.

But while it is advantageous for certain types of applications to be stored and executed locally, it may be difficult and/or inefficient to control such applications from a web browser. For example, if a user is surfing the web while listening to music, the user would have to constantly change windows between a web browser and the local media player in order to change tracks, adjust volume, etc. Further, consider the case where a user navigates a web browser to a web page that provides an option to stream a particular song or playlist. Liking the particular song that is suggested, the user starts the music and continues browsing the web. Later, the user comes across a web page in a different browser window or tab that provides an option to stream a new song. If the user selects the new song, both songs would be played simultaneously because there is no way for one web page to know that another has initiated audio playback of a new song. The user is thus forced to spend time navigating among the open browser instances to locate the web page that is providing the unwanted music, stop that music, navigate back to the new page, and finally start the new music. This is inconvenient. In light of these and other problems, it would be beneficial to provide modules for inclusion in web pages that enable control of and interaction with local applications without having to leave the web browser environment or direct attention away from the web page. Moreover, it would be beneficial to allow web page creators and administrators to quickly and easily create modules for inclusion into web pages, without requiring extensive programming, to enable the communication between the local utility and the web browser.

Accordingly, the ideas and embodiments discussed herein enable a seamless user experience between locally stored and executed utilities (such as a media player) and web pages and other remote content (collectively, a "web page") retrieved by and/or displayed in a separate application (such as a web browser). The disclosed systems and methods allow a user to control the local utilities without navigating away from a web page. Moreover, the disclosed systems and methods can allow control of a single local utility through multiple different modules and/or web pages, which helps to avoid control conflicts, such as the simultaneous music playback scenario described above. In some cases, the disclosed embodiments may be employed by entities seeking to improve the convenience and accessibility of the local applications that they provide to consumers, as well as to allow seamless integration with other resources such as web pages that users may visit.

Attention is now directed to the figures, and in particular FIG. 1, which illustrates a block diagram of a client-server environment, according to some embodiments. The client-server environment includes a client computer system 102, a web server 104, a module server 122, a DNS server 114, and a network 106.

The client computer system 102 ("client computer 102") includes a web browser 108, a local web server 112, and a local utility 110. The web browser 108 is configured to retrieve and/or display a web page 116. Using the systems and methods disclosed below, the client computer 102 permits a user to interact with the local utility 110 via the web browser 108, rather than requiring the user to interact with the local utility 110 in a separate window or application environment.

In some embodiments, a web page 116 is sent to the client computer 102 by the web server 104. For example, the web page 116 may be a blog or a social networking web page that is retrieved from a web server 104 at the request of a user. Of course, and as noted above, the web page 116 may be and/or include any type of remote content, including e-commerce, news, entertainment, media, and/or other web pages. In some embodiments, the web page 116 includes a plurality of links that are configured to initiate communications between the web browser 108 and the local web server 112. In some embodiments, the links are associated with local utility controls 120. Links associated with the local utility controls 120 are also referred to herein as local utility control links. In some embodiments, the links are html elements that are programmatically associated with the local utility controls 120.

In some embodiments the local utility 110 is a media player (e.g., a media player that is configured to play locally or remotely stored media), and the local utility controls 120 include graphical elements that, when selected, cause the local utility to perform media playback or viewing functions, such as play, pause, stop, skip, etc. (A user may select the graphical elements in any appropriate manner, such as a mouse click, a keyboard input, a touch input, a voice input, etc.) In some embodiments, the local utility controls 120 include output elements, such as a "now playing" window, that show information about media that is currently being played by the media player.

In some embodiments, the links are not directly associated with output elements or selectable elements, but rather enable other necessary or desirable communications between the web browser 108 and the local web server 112. Further, while the following disclosure frequently refers to local utility "controls," the teachings are applicable to any elements in a web page that send requests (e.g., http requests) to the local utility 110. The requests may change an operating condition of the local utility 110 (e.g., skip a track), request information from the local utility (e.g., "now playing" information), or cause the local utility 110 to take any other action.

In some embodiments, the local utility controls 120 and their associated local utility control links are contained in a module 124 that is received from the module server 122. In some embodiments, the web page 116 includes an html element or other computer code that causes the module (i.e., the contents of the module) to be downloaded from the module server 122 for inclusion in the web page 116. In some embodiments, the module 124 is an inline frame. (An inline frame causes a document to be embedded within another document.) In some embodiments, the module is an inline frame defined by an html iframe element in the web page 116. Modules may include local utility controls 120 for various different types of local utilities, such as media players and viewers, camera or webcam control applications, download managers, etc. A module may sometimes be described as a "widget" for controlling and/or viewing certain aspects of the local utility 110. Modules, their contents, and how they are created are discussed below with reference to FIGS. 6A-B.

The local web server 112 communicates with the local utility 110, such that requests issued from the web browser 108, such as http requests, are received by the local web server 112, and information from the requests is transmitted or otherwise provided to the local utility 110. It should be appreciated that in the present discussion, communicating with the local web server 112 may be considered to be the same as communicating with the local utility 110, as the local web server 112 acts as a front end for the local utility 110. In some embodiments, the local web server 112 is programmatically integrated with the local utility 110, and acts as a dedicated interface between the local utility 110 and the local web browser 108 (and/or other local or remote applications). In some embodiments, the local utility 110 and the local web server 112 are part of the same software application, and operations or functions that are described herein as being performed or provided by one may be performed or provided by the other.

In some embodiments, the web browser 108 communicates with the local web server 112 via internet protocol (IP) communications. For example, in some embodiments, the links in the web page 116 (e.g., the links associated with the local utility controls 120) are uniform resource locators (URLs) that, when executed, cause the web browser 108 to send a hypertext transfer protocol (http) request to a particular IP address. In some embodiments, http requests include parameters and/or commands that are recognized by the local web server 112 and/or the local utility 110, and that will cause the local utility 110 to take some action. In embodiments where the local utility 110 is a media player, the parameters and/or commands may cause the media player to perform a playback control function (e.g., stop, play, skip, etc.), or may cause the media player to provide requested information to the web browser 108 (e.g., the currently played song, the most recently played album, etc.).

In order for the local web server 112 to receive http requests from the web browser 108 when a local utility control 120 is executed, the local utility control link must be directed to the IP address of the local web server 112. This functionality may be provided by associating the local web server 112 with a loopback address, and linking the loopback address to a predefined domain name.

Specifically, in some embodiments, the local web server 112 is associated with the loopback address (or loopback network address) of the client computer 102. As used herein, a loopback address is a self-referencing address, such that communications (including IP communications) issued from a computer and addressed to the loopback address will be received by the same computer. In embodiments where IPv4 protocol communications are used, the loopback network address of a computer corresponds to an IP address of 127.0.0.1 (as shown in FIG. 1). In some embodiments, other loopback network addresses are used.

In order for the web browser 108 to send an http request to the local web server 112, the web page 116 may include a link associated with a URL such as "http://127.0.0.1/[command]." (As described in detail below, the [command] portion of the URL may be configured to cause the local utility 110 to perform some action.) When the link is executed, the web browser 108 will send an http request to the IP address 127.0.0.1, which corresponds to the local web server 112. Thus, communications are enabled between the web browser 108 and the local web server 112 (and hence the local utility 110).

For various reasons, however, it may not be practical to include the loopback address directly in the URLs of the local utility control links (i.e., by hard-coding 127.0.0.1 into the URL). For example, security features used in some embodiments of the present invention are not possible if the URLs are addressed directly to the loopback address. Rather, it may be beneficial to use a domain name rather than an IP address in the URL. Thus, one or more external domain names may be registered in a domain name system and associated with the loopback address. As shown in FIG. 1, a domain name system (DNS) server 114 includes a domain name table 118. A domain name table maps domain names to network addresses (such as IP addresses). When a web browser issues an http request to a URL, DNS servers are typically used to convert the domain in the URL into an actual network address. For example, a browser issuing an http request to the URL www.Example.com/home, will need to determine an actual network address from which to request the "home" page. In order to do so, the web browser 108 communicates with the DNS server 114, requesting a network address (e.g., an IP address) for the domain "Example.com." As shown in FIG. 1, the domain name table 118 correlates the domain "Example.com" with an IP address of 75.25.1.92, which the DNS server 114 will return to the web browser 108. The web browser 108 then sends its request for the page "/home" (and indeed any other communications intended for "Example.com") to the IP address of 75.25.1.92.

In some embodiments, in order to facilitate communication between the web browser 108 and the local utility 110 on the client computer 102, a domain may be registered in a domain name system, where the domain is associated with the loopback address. As shown in FIG. 1, the domain name table 118 includes an entry for the domain "loopdomain.com," which is associated with the loopback network address of 127.0.0.1.

The DNS entry associating "loopdomain.com" with a loopback address may be used in conjunction with the links in the web page 116 as described above. Specifically, instead of hard-coding the loopback IP address in the local utility control links, the links may be associated with a URL such as "http://loopdomain.com/[command]." Because this domain is mapped, via domain name table 118, to the loopback address, any http requests addressed to this domain are sent from the web browser 108 to the local web server 112 directly, without being sent to any other computers (and indeed without ever leaving the local client computer 102). However, because the URL is associated with an external domain name, rather than simply an IP address, several other features and benefits may be achieved, such as those discussed below with reference to FIG. 3.

In order to communicate via IP protocol, the web browser 108 and the local web server 112 use several techniques to establish and maintain open communication channels. In some embodiments, the web browser 108 must communicate with the local web server 112 using an open port, such as an open TCP/UDP port. In some embodiments, the web browser 108 uses a port scanning technique to identify an available port on the local web server 112. For example, in some embodiments, the web page 116 and/or the web browser 108 attempt to connect to the local web server 112 by finding the first available port in a predefined port range. Once an open port is identified, the web browser 108 will communicate to the local web server 112 via that port.

However, no open port on the local web server 112 will be found if the server is not running on the client computer 102 when the web browser 108 is attempting to identify an open port. In some cases, failing to identify an open port indicates to the web browser 108 (or to a script or other code in the web page 116) that the local utility 110 is not currently running on the client computer 102. Thus, the web browser 108 may be configured to automatically launch the local utility 110. (For the purposes of this discussion, launching the local utility 110 includes launching the local web server 112.) In some embodiments, this is achieved using a custom URI scheme that is recognized by an operating system of the client computer 102. In some embodiments, the web page 116 may include a link that uses the custom URI scheme, and contains a command to launch the local utility 110. When this link is executed by the browser (after no open ports are identified), the client computer 102 launches the local utility 110 so that communication with the web browser 108 may be established.

In one example, if a user is viewing a web page that includes a media player widget, and the user selects a "play" command, the web browser 108 will attempt to communicate with the local utility 110 via the port scanning method described above. If the local utility 110 is not running, the web browser 108 will execute a link using the custom URI scheme to launch the local utility 110, and thereafter successfully communicate the command to play the selected song.

Figure 2:
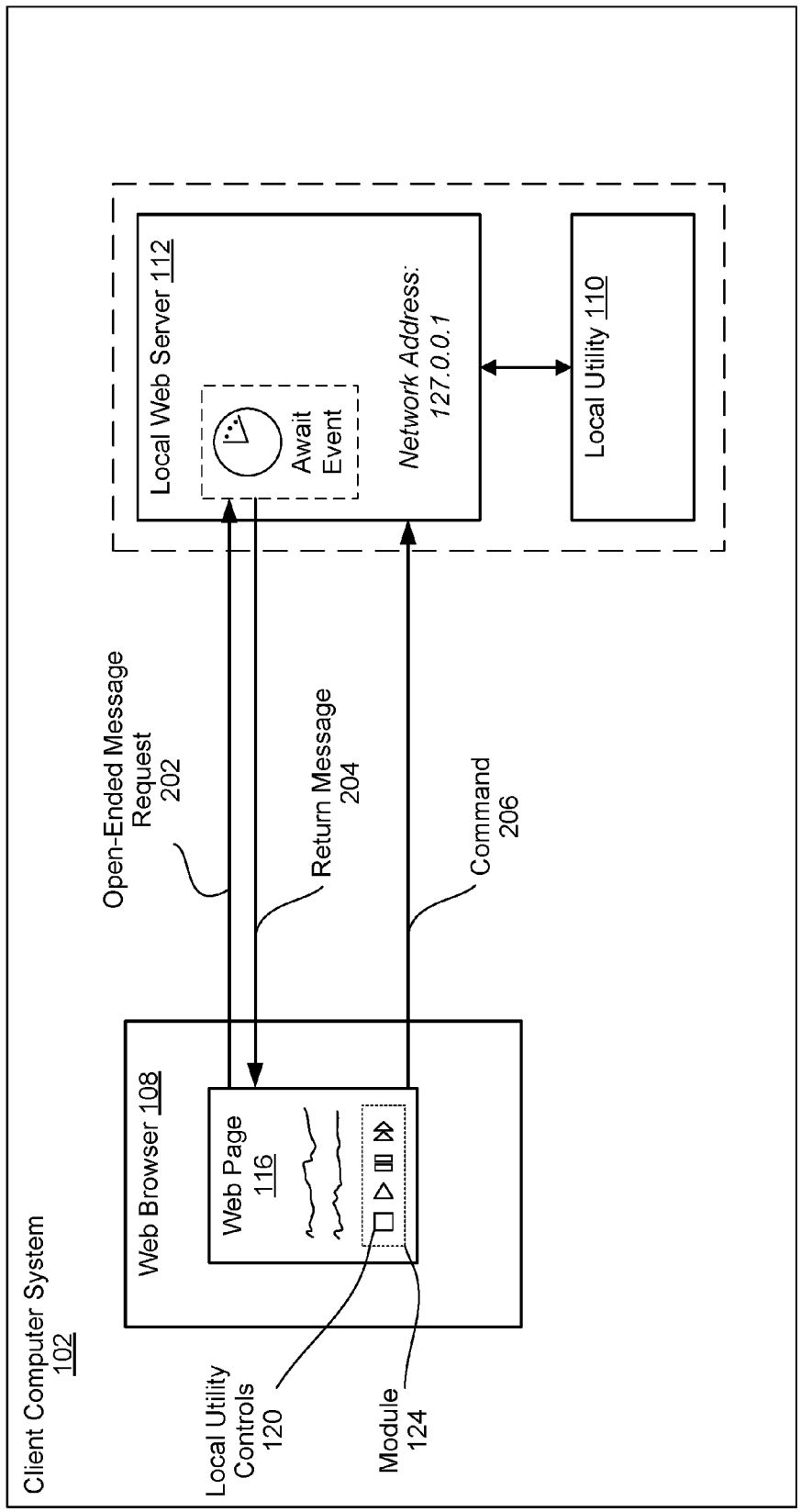
FIG. 2 is a block diagram illustrating a client computer system, according to some embodiments.

FIG. 2 is a block diagram illustrating how real-time, bidirectional communications may be established between the web browser 108 and the local server 112 in a client computer system 102. In http communications, web servers may not initiate uninvited communications with a web browser at a client computer. Rather, web servers may only respond to requests issued by a web browser. Thus, while communications pass between web browsers and web servers, all communications must be first initiated by the web browser. But in certain situations, a web server should be permitted to send information to a web browser without a specific request for it. For example, it may be beneficial for a local media player application to send information about a currently played song, such as to populate a "now playing" window in a media player widget in a web page. And, the local media player should be able to send updated information about the currently played song whenever updates occur, not merely when the web browser requests an update.

In some embodiments, as shown in FIG. 2, the web page 116 is configured to send an open-ended message request 202 to the local web server 112. In some embodiments, the open-ended message request 202 is sent from the web browser 108 immediately upon loading of the web page 116, such that any information that the local utility 110 wants to send to the web browser 108 may be sent in response to the message at any time thereafter. In some embodiments, the open-ended message request 202 is a request for any type of information that the local utility 110 wants to provide to the web browser 108. In some embodiments, the open-ended message request 202 is a request for a predefined category of information, such as a currently playing song, in embodiments where the local utility 110 is a media player.

Once the local web server 112 receives the open-ended message request 202, the local web server 112 takes no action with respect to the request until the local utility 110 determines that there is some information to be sent to the web browser 108. In some cases, the local utility 110 will not have any information to send to the web browser 108 immediately after the open-ended message request 202 is received. Thus, the local web server 112 awaits an event that requires sending a return message 204. When such an event occurs, the local web server 112 sends the return message 204 to the web browser 108. In some embodiments, the web browser 108 then immediately sends another open-ended message request 202 to the local web server 112 so that there is always a pending request. In this way, the local web server 112 can send "unsolicited" information to the web browser 108 via the open open-ended message request 202.

On the other hand, when the web browser 108 is ready to issue a command to the local web server 112, such as when a user has selected one of the local utility controls 120, the web browser 108 will simply issue the command 206. Because the web browser 108 does not need an invitation to send the request, the command 206 may be sent at any time. In some embodiments, the command 206 is part of an http request. Using commands 206 and the open-ended message requests 202, continuous and bidirectional communication is enabled between the local web server 112 and the web browser 108.

In some embodiments, the web browser 108 requires several connections with the local web server 112 in order to facilitate all of the communications required by the web page 116 and/or the module 124. This may present a problem, because some browsers limit the number of simultaneous connections to any single server. In some cases, though, a web page 116 may require more than the maximum number of server connections in order to enable the desired level of interactivity with the local utility 110. For example, a user may have multiple web pages open in a single browser, where multiple web pages have local utility controls 120 in communication with the local utility 110. Accordingly, it is possible for the browser to quickly exceed the maximum allowable number of simultaneous connections to the local web server 112. Further, the problem may be exacerbated by the open-ended message requests described above, because maintaining the pending requests may persistently occupy numerous available connections.

This problem may be avoided by connecting to the local web server 112 through multiple subdomains. Specifically, a domain associated with the loopback address may be divided into multiple subdomains, such as random1.loopdomain.com, random2.loopdomain.com, etc. In some embodiments, as shown in the domain name table 118 in FIG. 1, these subdomains are each associated with the loopback address (in this case 127.0.0.1). Links in the web page 116 that are intended to initiate communications with the local web server 112 may be distributed among these subdomains, so that any request from the web browser 108 to any of these subdomains will be directed to the local web server 112. And because the requests are sent to different domain names, the web browser 108 will register the requests as being directed to different servers, and will, therefore, not limit the number of open connections.

Figure 3:
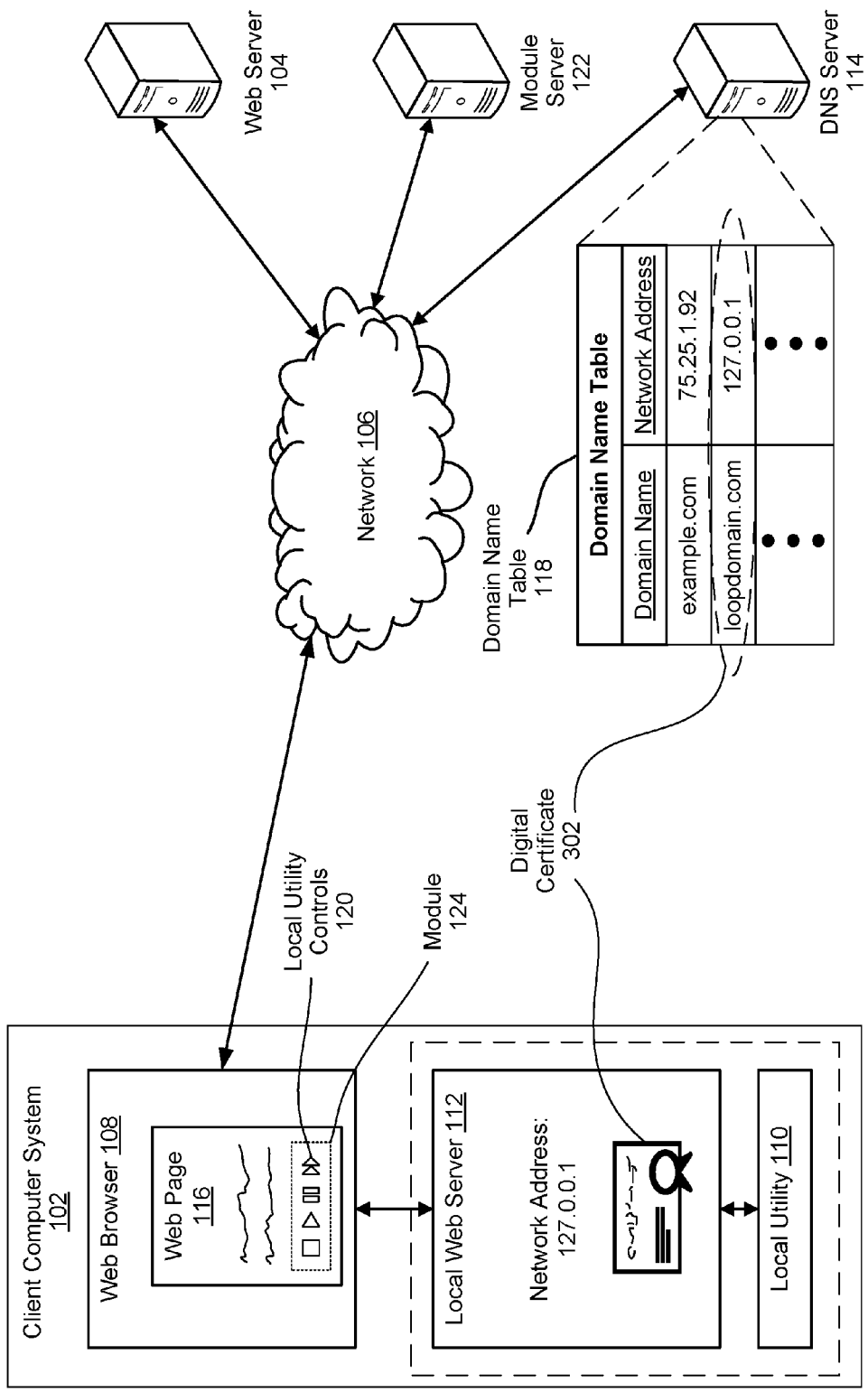
FIGS. 3-5 are block diagrams illustrating client-server environments, according to some embodiments.

FIG. 3 is a block diagram illustrating how communications may be established between a web browser 108 and a local web server 112 where the web page 116 is received via a secure protocol, according to some embodiments.

In some instances, web pages are sent to web browsers via a secure protocol, such as hypertext transfer protocol secure (https). Web browsers, however, are configured to issue alerts or warnings to a user when a web page includes https content as well as http content. Thus, if web page 116 is received by the web browser 108 via https (e.g., https:// www.Example.com), but the local utility controls 120 are associated with regular http (e.g., http://www.loopdomain.com/[control]), the web browser 108 may display warning messages to the user. Thus, it is beneficial to allow the web browser 108 and the local web server 112 to communicate via https. Among other benefits, this will avoid triggering warning messages in the web browser 108.

Before it may freely communicate with a web server via secure protocol, a web browser must establish a secure communication channel with the web server. A secure communication channel describes an authenticated and/or secure session between two or more devices for the purposes of protected communications. A secure communication channel presupposes a successful authentication routine between the two devices. Secure communication channels may be established through a routine that includes transferring a digital certificate from a remote server to a client computer. In some embodiments, the web browser 108 and the local web server 112 establish a secure communication channel using this type of authentication routine. Specifically, in some embodiments, the local web server 112 stores a digital certificate 302 that the web browser 108 may request from the web server 112 in order to authenticate the web server 112. In some embodiments, the digital certificate 302 contains a public key with which the web browser 108 encrypts one or more messages that are sent to the local web server 112.

In typical computer networking usage, digital certificates are uniquely associated with a single domain (including its subdomains). In some cases, in order for authentication to succeed, the digital certificate must be associated with the same domain to which a certificate request is sent. For example, if a certificate request is sent from a web browser to a server associated with www.BankPage.com, and the server returns a digital certificate that is associated with www.EvilPage.com, then the web browser 108 will recognize that there is a mismatch between the domain of the request (BankPage.com) and the domain of the certificate (EvilPage.com). This may occur, for example, if a server from EvilPage.com is masquerading as a server from BankPage.com, attempting to intercept communications intended for BankPage.com. Because of the domain mismatch, though, the authentication will fail, and the web browser will not communicate further with the server from EvilPage.com.

As noted above, in some embodiments the local utility controls 120 are associated with links to an external domain (e.g., loopdomain.com). Thus, in order for the local web browser 108 to establish a secure communication channel with the local web server 112 using the above described authentication process, the local web server 108 must have a digital certificate associated with that same domain. Accordingly, in some embodiments, the local web server 112 stores a digital certificate 302 that is associated with the same domain of the local utility control links (e.g., loopdomain.com).

Attention is returned to FIG. 3, which illustrates an embodiment where the local utility control links specify https protocol, and refer to the external domain "loopdomain.com." For example, a local utility control 120 may be a "play" button, and may be associated with the following link: https://loopdomain.com/[play command]. Upon executing this link (such as in response to a user's selection of a play button in the web page 116), the web browser 108 will attempt to establish a secure communication channel with the server at the address supplied by the DNS server 114. As shown in FIG. 3, the address for loopdomain.com is the loopback address, so the web browser 108 will send a request for a digital certificate to the local web server 112. In response, the local web server 112 will send the digital certificate 302 (associated with loopdomain.com) to the web browser 108. In this case, the browser 108 requested a certificate from loopdomain.com (because the executed link was addressed to that domain), and received, from the local web server 112, a certificate associated with that domain. Thus, the web browser 108 confirms that the certificate is associated with the same domain as the request, thus completing this portion of the authentication routine and establishing a secure communication channel between the web browser 108 and local web server 112.

In some embodiments, the digital certificate 302 is bundled with the local web server 112 when it is provided to a user of the client computer. In some embodiments, the digital certificate 302 is copied and included in every instance of the local web server 112. In some embodiments, the digital certificate 302 is a wildcard certificate, such that the certificate authenticates any subdomain associated with the parent domain (e.g., random1.loopdomain.com, random2.loopdomain.com, etc.). In other embodiments, the user obtains and/or installs the digital certificate when he first executes the local web server. In yet other embodiments, the user periodically updates and/or otherwise replaces the digital certificate.

The foregoing discussion describes an authentication process in terms of the https protocol, but the concepts disclosed also apply to other secure protocols and authentication techniques. Moreover, while digital certificates for https implementations are described, other types of authentication tokens, certificates, and routines may be used in place of those specifically described above. And while certain aspects of an authentication process are described above, other steps and/or procedures that are not discussed may be included. For example, the authentication process may establish encryption codes or keys to be used for the secure communication channel.

Figure 4:
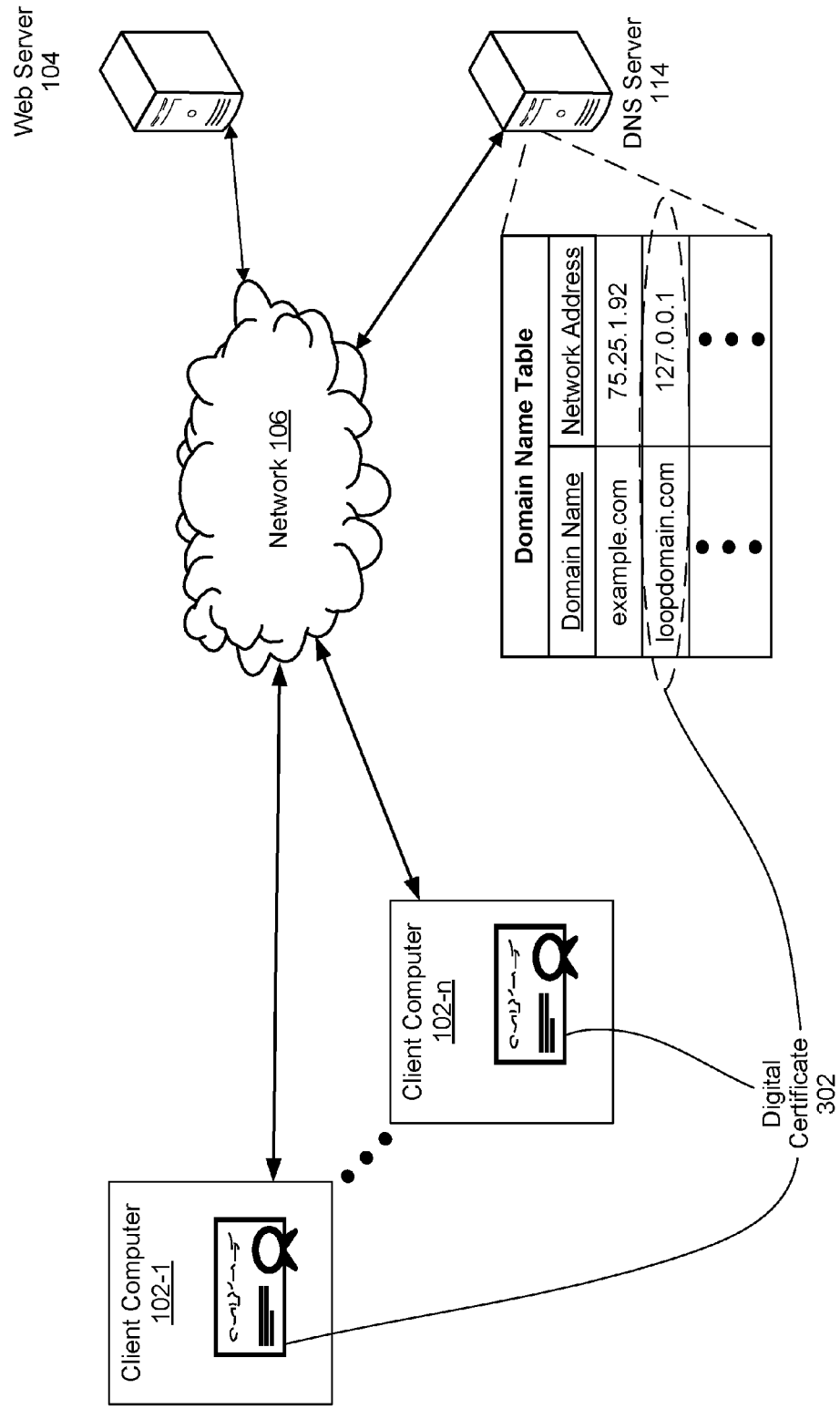

FIG. 4 is a block diagram illustrating multiple client computers 102-1-102-n in a client-server environment, according to some embodiments. As described above, the digital certificate 302 may be included in the local web server that is installed in each client computer 102-n. For example, if a company distributes media player software that includes a local utility (e.g., a media player application) and an associated local web server, each software package will include a copy of the digital certificate 302. Thus, the same digital certificate 302 (or identical copies of a single digital certificate) will be resident on each client computer 102-n.

Digital certificates 302 are typically closely guarded, and they are not intended to be shared outside the organization that owns the certificate. Accordingly, the digital certificate 302 may be considered to be compromised when used as described in FIGS. 3-4, because copies are resident on different computers that are not owned or controlled by the certificate owner. Indeed, the client computers are associated with the users of the software packages, and not the party to whom the certificate was issued.

Typically, a compromised security certificate is a serious security concern. For example, if the digital certificate for a checkout page of an online commerce website is compromised, communications between clients and the server of the commerce website might be intercepted by malicious third parties. However, the fact that the certificate is compromised does not create a similar security risk in the above described embodiments. Rather, the encrypted communications simply loop back to the client computer itself, so the secure messages never actually leave the client computer. These internal communications are not easily intercepted or otherwise tampered with by malicious parties.

In some cases, the local web server 112 should only accept commands and requests from an authorized module 124 in order to prevent malicious web pages from communicating with the local utility 110 to perform undesirable operations or access sensitive data. For example, if the local utility 110 is a camera control application, a malicious web page may attempt to activate an attached webcam and capture unauthorized images. Or, a malicious web page may attempt to extract media access history from a media player. The local web server 112 should therefore be able to determine whether requests from a web page are authorized, and prevent those requests that are not. An example method according to an embodiment of the present invention is discussed with reference to FIG. 5.

Figure 5:
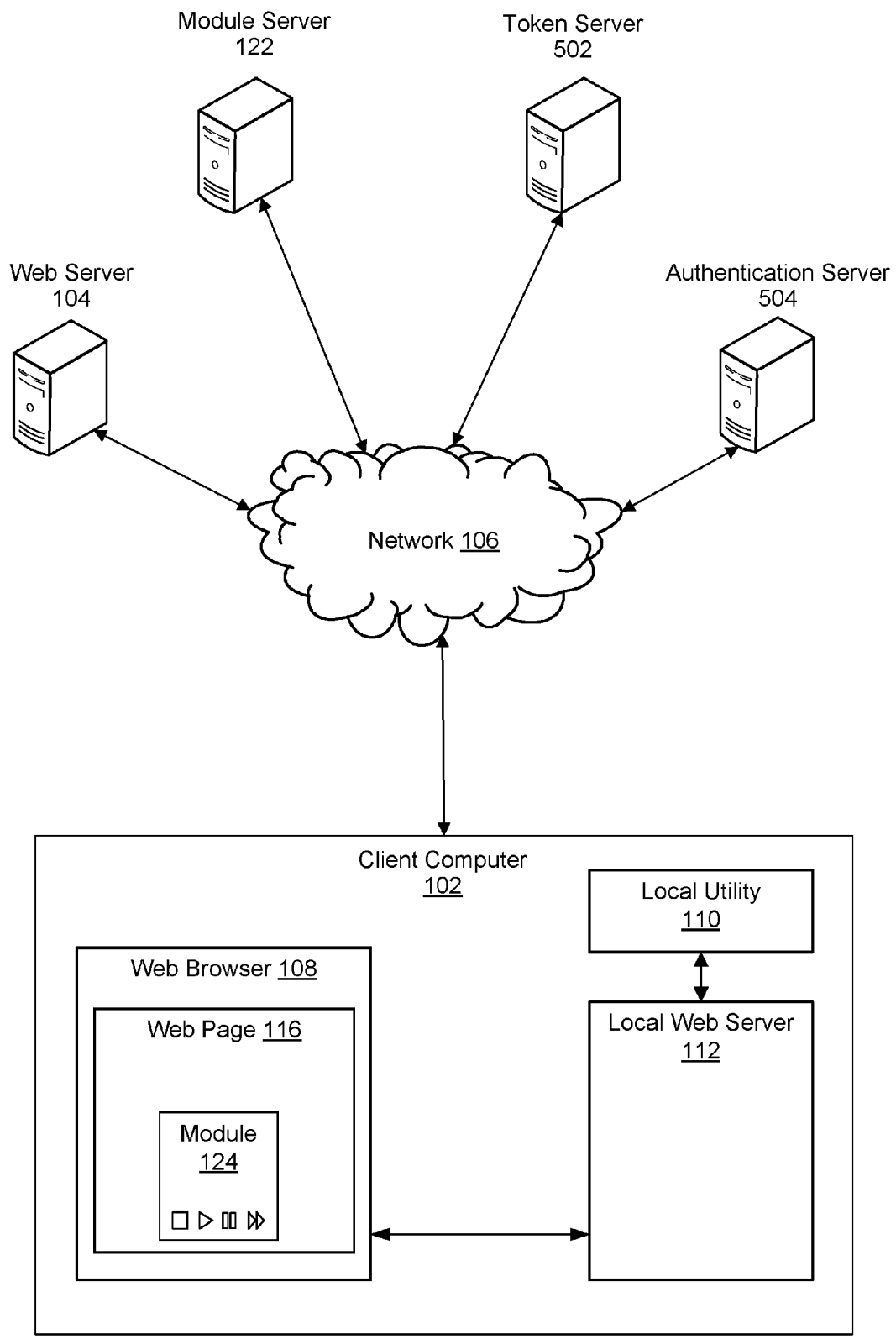

FIG. 5 illustrates a block diagram of a client-server environment in accordance with some embodiments. The client-server environment includes the client computer 102, the web server 104, the module server 122, a token server 502, and an authentication server 504, each coupled to the network 106. The client computer 102 includes a web browser 108, a local utility 110, and a local web server 112, as described above in reference to FIG. 1. In some embodiments, the module server 122, the token server 502, and the authentication server 504 are all associated with a common entity or service provider.

In some embodiments, a token passing procedure is used to establish authenticated communications between the module 124 and the local web server 112, as described below with reference to the client-server environment of FIG. 5.

The web browser 108 is configured to receive a web page 116 from the web server 104. In some embodiments, the web page 116 includes a reference to a module 124 that includes local utility controls 120, where the module (and/or the contents of the module, including the local utility controls 120 and local utility control links) is received from the module server 122. In some embodiments, the web server 104 and the module server 122 are associated with different domains. In some embodiments, the reference to the module is an html iframe element associated with a URL of the module server 122.

When the web browser 108 receives the web page 116 from the web server 104, the web browser 108 will then contact the module server 122 to receive the module 124. In some embodiments, in response to receiving the request for the module 124, the module server 122 requests and receives a first token from the token server 502. The module server 122, then sends the module 124 and the first token to the web browser 108. In some embodiments, the token is a character string, file, or any other information that can be included in http communications or otherwise shared between computers.

Next, the first token is sent from the web browser 108 to the local web server 112. In some embodiments, the module 124 is configured to send the first token to the local web server 112 along with an http request initiated by the execution of a link included in the module 124. If no token is included in a request to the local web server 112, the request will be ignored. If the first token is included in a request, the token is passed from the local web server 112 to the local utility 110 for authentication.

In some embodiments, in order to authenticate the first token, the local utility 110 sends the first token to the authentication server 504. The authentication server 504 confirms, using the token server 502, whether the token server 502 actually issued the first token. The authentication server 504 then replies to the local utility 110 whether the first token is authentic (e.g., whether the first token was issued by the token server 502 to the module 124).

If the reply from the authentication server 504 indicates that the first token was not issued by the token server 502, the local utility will ignore the request from the web browser 108, and take no further action with respect to any commands contained therein. If the reply indicates that the first token is authentic, the local utility 110 (and/or the local web server 112) will generate a second token, and the web server 112 will send the second token to the module 124. The module 124 then includes the second token in all subsequent requests to the local web server 112, and the local web server 112 will only take action on requests that include the second token.

In some embodiments, the only permissible communications between the local web server 112 and the web browser 108 are those that originate from a module provided by the module server 122. The above-described token passing method thus prevents unauthorized communications between a web page and the local web server 112, because only requests that include a valid second token will be recognized, and a valid second token can be acquired only after authentication of the first token by the authentication server 504.

The foregoing describes aspects of how to enable continuous and bidirectional communications between a web browser 108 and a local utility 110 in order to allow a user to interact with the local utility 110 via a web page received from a remote source. One aspect relates to providing local utility controls 120 in the web page 116. Aspects of the local utility controls 120 and the module 124 are discussed with reference to FIGS. 6A-B.

Figure 6A:
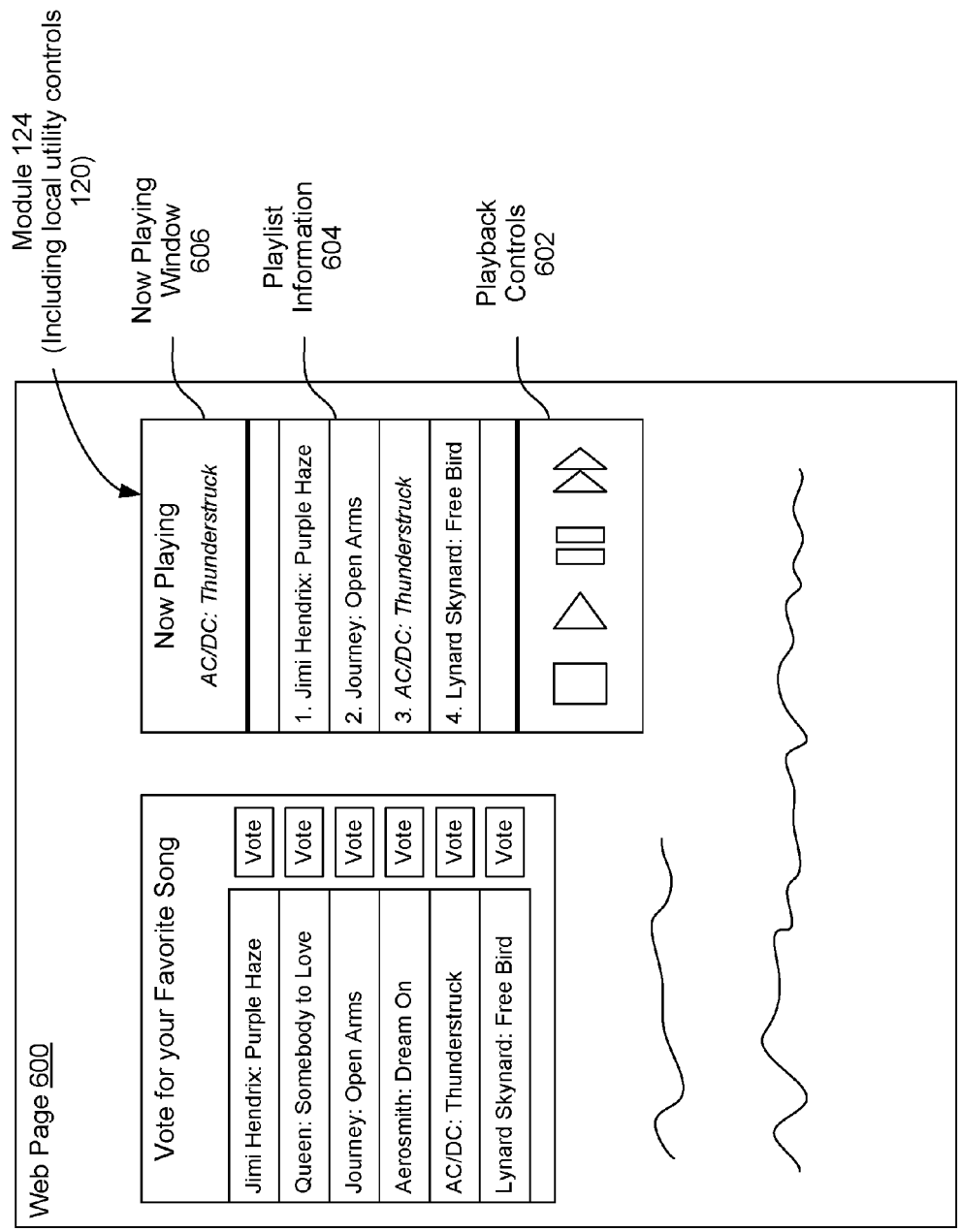
FIGS. 6A-6B are block diagrams illustrating web pages, according to some embodiments.

FIG. 6A is a block diagram illustrating a web page 600 and the module 124 according to some embodiments. The module 124 includes several local utility controls 120 for controlling and providing information about a local utility 110 that is a media player. In some embodiments, the local utility controls 120 include playback controls 602, playlist information 604, and a now playing window 606. In some embodiments, the module 124 is capable of displaying other information, such as images (e.g., album art), text (e.g., lyrics), scrolling and/or synchronized text (e.g., karaoke display), videos (e.g., music videos), and the like. Different combinations of local utility controls 120, including different, more, or fewer controls are also possible. Moreover, the type of local utility controls 120 in the module 124 will depend on the particular type of local utility 110 with which they are configured to communicate.

As described above, in some embodiments, the module 124 is an inline frame, which may be defined by an html iframe element. In some embodiments, the contents of the inline frame are received from a remote server (e.g., the module server 122). In some embodiments, the html of the web page 600 includes a link that specifies to the module server 122 exactly what local utility controls 120 should be included in the module 120. In some embodiments, the link specifies other aspects of the module 124 as well. If the module 124 is a media player widget, for example, the link can specify what songs the widget should offer to the user.

Specifically, a web page creator may want to include in a web page 600 a widget that is configured to allow a web page visitor to play a certain song, playlist, album, radio station, etc. This way, the web page 600 can provide a customized and unique user experience for its visitors. Accordingly, the web creator may use a module creation service that provides customized modules for inclusion into web pages, and specify exactly what song or songs (or other media type) should be included in the module 124. The service may provide a custom link (e.g., URL) that corresponds to the specific module contents requested by the creator. By including this custom link in the web page 600, the module will be populated with exactly what the creator requested. And, as described in detail above, when a visitor requests playback of a song offered in the module 120, the web page 600 will communicate with the local utility 110 in order to initiate playback of the song. (In embodiments where the local utility 110 is a media player, the media player may access locally stored files to play the user's selection, or may receive the media from an external media provider. In some embodiments the media provider is associated with the module creation service.)

In some embodiments, the custom link is a URL that is addressed to the domain associated with the module server 122, and includes a unique character string that is recognized by the module server 122. In some embodiments, the unique character string is provided by the module server 122 in response to a request to provide a custom link for a module 124 with particular content. For example, a web page creator may request (from the module server 122) a module populated with the creator's favorite album or playlist. In return, the module server 122 creates a custom link including the unique character string and provides it to the web page creator. When the custom link is executed (causing the web browser 108 to make an http request that includes the character string to the module server 122), the module server 122 determines the requested module content based on the character string, and provides that content to the web browser 108.

In some embodiments, the contents of the module 124 are established automatically and in real-time by the web page 600. In some embodiments, the web page 600 includes code (e.g., a script) that requests a custom link from the module server 122 based on dynamically generated information. For example, a web page 600 may display a list of songs, and allow users to vote for their favorites. When loaded by a web browser, the web page 600 may request a custom link from the module server 122 based on the current top-rated songs. Accordingly, as the voting results change over time, or as new songs are added to and others are removed from the voting list, the contents of the module (that is created when the web page 600 is loaded) will change accordingly.

In some embodiments where the local utility 110 is a media player, the module 124 does not provide predetermined media options to a user, but rather acts as a window to the current status of the media player. For example, instead of showing a song, album, or playlist that the web page specifies, the module 124 shows the user's currently selected playlist and "now playing" information. Accordingly, this module 124 may simply be provided by the web page 600 as a convenience to the user, so that they do not have to navigate away from the web page 600 in order to control their media player.

Figure 6B:
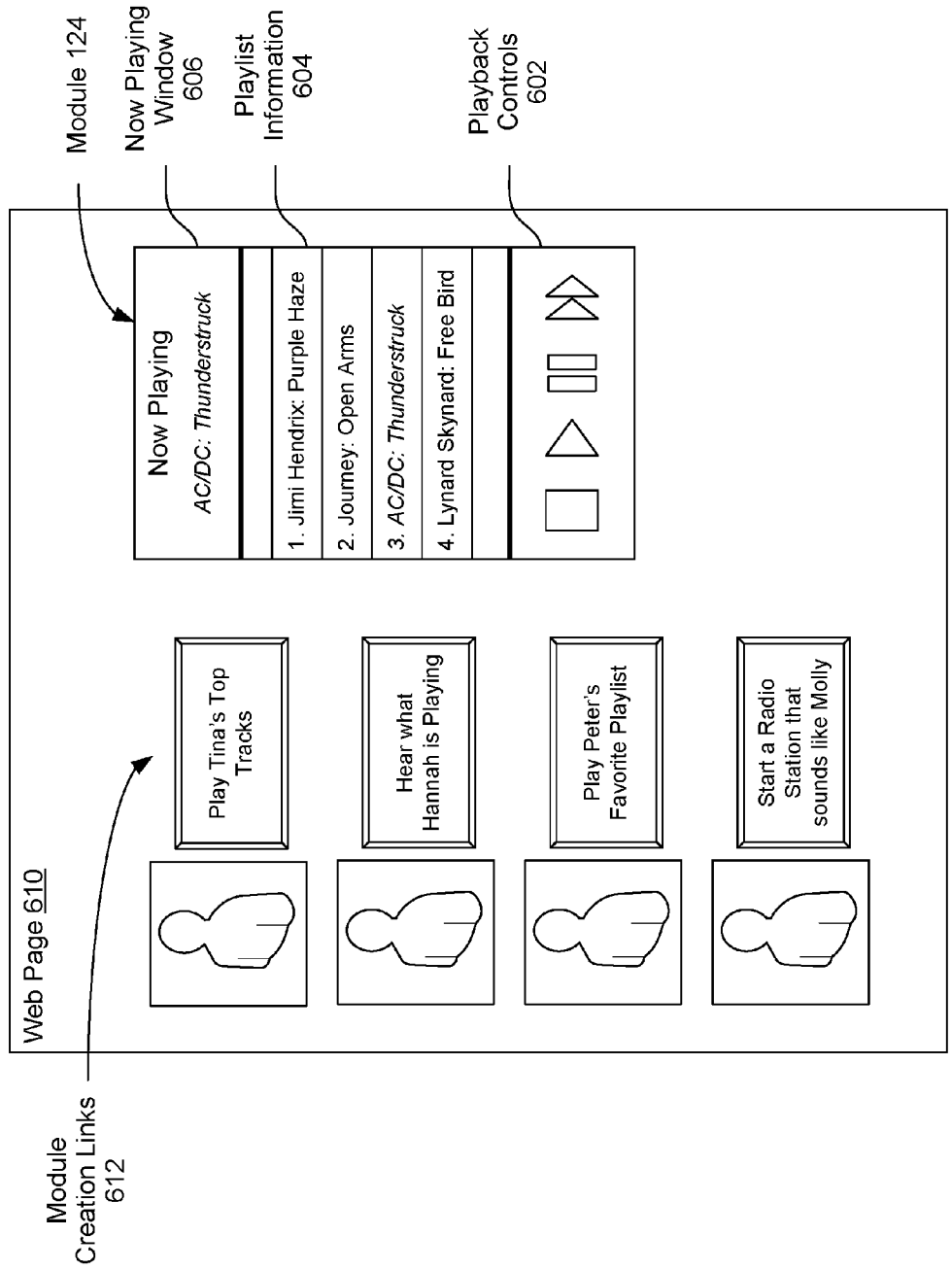

FIG. 6B is a block diagram illustrating a web page 610 and a module 124 according to some embodiments. Like web page 600, web page 610 includes a module 124 that includes local utility controls 120 including a now playing window 606, playlist information 604, and playback controls 602. (As noted above, many different combinations of local utility controls 120 may be included in the module 124.) Web page 610 also includes several module creation links 612. In some embodiments, module creation links 612 are associated with code (e.g., a script) that will request a custom link from the module server 122 when the module creation links 612 are executed. In some embodiments, when a module creation link 612 is selected (causing the web browser 108 to make an http request that includes the character string to the module server 122), the module server 122 creates a module in accordance with information contained in the request. The module can then be included in the web page 610 for display to a user.

In some embodiments, the module creation links 612 are associated with information shared by other people or entities. In some embodiments, the module creation links 612 may be associated with information provided by members of a social network. For example, the web page 610 may be associated with a social network where users can share information, such as information about their media consumption (including their media access history, stored playlists, favorite songs, and the like). In some embodiments, users share such information by posting the information to a web page, and/or by allowing access by the social network to their personal information (e.g., by retrieving information from the user's media player or media service to which the user subscribes).

The web page 610, or the provider thereof, may use this information to create and/or provide module creation links 612 that are based on the users' information. The module creation links 612 may then be presented to other users so that they can create modules based on that information. (To protect privacy, module creation links 612 based on one user's information may be provided only to others with whom the user has authorized such sharing.) As shown in FIG. 6B, the module creation links 612 may allow a user to create modules based on another user's top tracks, another user's favorite playlist, and/or what another user is currently playing. A module creation link 612 may also allow a user to start a radio station that "sounds like" another user.

A user's "top" or "favorite" songs or playlists may include those that are most frequently played, most recently played, highest rated, etc. And while the example module creation links 612 shown in FIG. 6B mention "tracks" and "playlists," these links may be based on any media information or classification, such as songs, playlists, albums, artists, genres, radio stations, musical themes, etc.

In some embodiments, what another user is "currently playing" is based on a module that was recently created for that user. For example, some web pages are able to request and/or display the modules, but are unable to identify real-time status of the module (or the local utility) after it is created. Thus, while it may not be able to determine with certainty what song or playlist is actually active at any given user, the web page and/or web page provider may have a record of what modules were recently created on any given user's behalf.

In some embodiments, module creation links 612 may use a music selection algorithm to determine what songs, artists, genres, etc., to include in a module 124. For example, if a user selects a module creation link that is configured to start a radio station that sounds like a particular user, it may be necessary to determine what that user "sounds like" (i.e., a musical fingerprint based on that user's tastes and/or preferences) and then select songs that match that description. In some embodiments, the musical fingerprint of a user is based on their most frequently played, most recently played, or highest rated songs, artist, genres, etc. The musical fingerprint is then used to seed a music selection algorithm that provides music (e.g., song identifiers) for inclusion into the module 124. In some embodiments, the musical selection algorithm is provided by the web server 104, the module server 122, the provider of the web page 610, or any other remote source.

Figure 7:
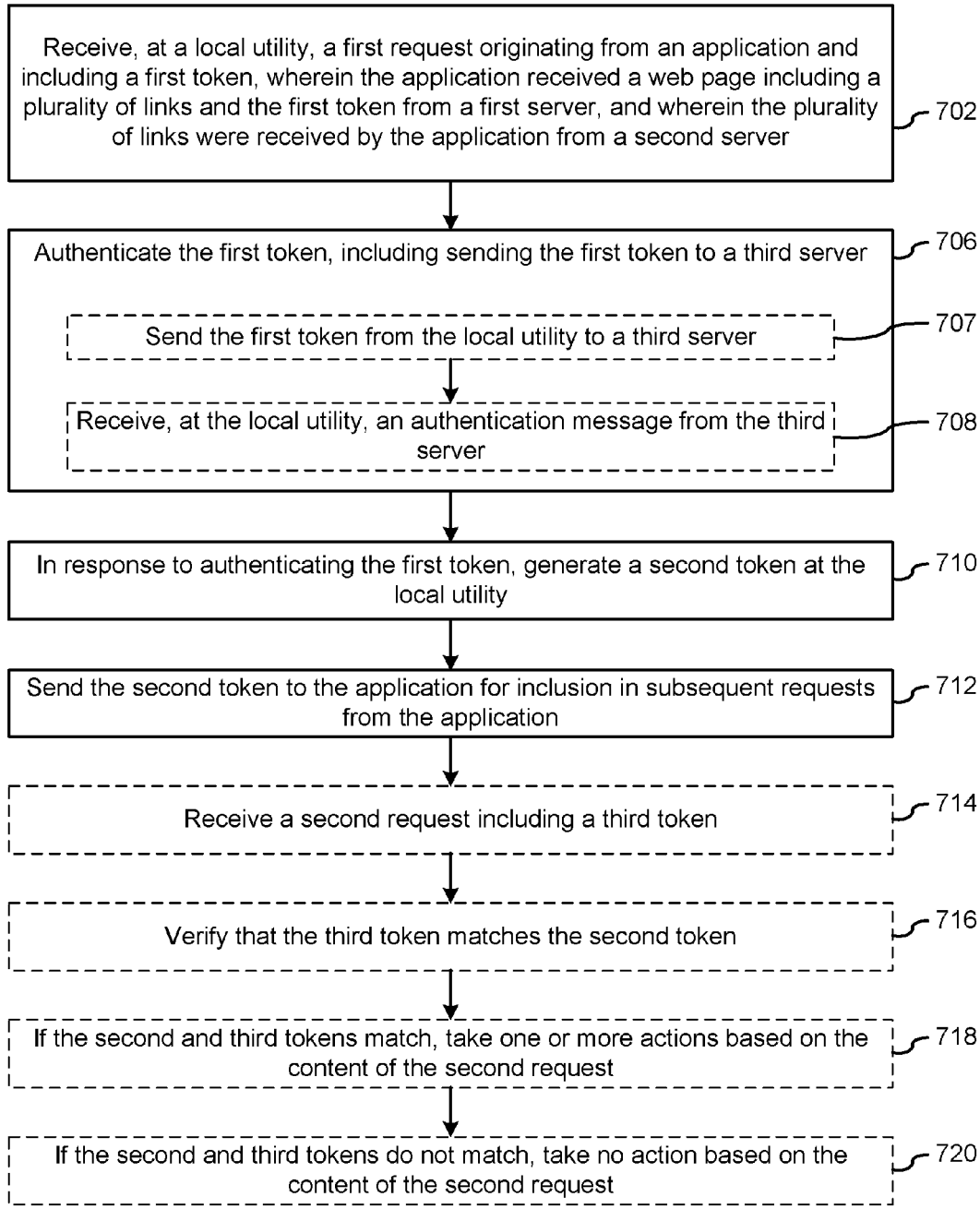
FIG. 7 illustrates a flowchart of a method for controlling a local utility, according to some embodiments.

FIG. 7 is a flow chart representing a method 700 for controlling a local utility, according to some embodiments. The method 700 is performed at a client computer (e.g., the client computer 102) having at least one processor and memory, the memory storing instructions for execution by the processor. In some embodiments, the method 700 is performed at the local computer 102, including any of the local utility 110, the local web server 112, and/or the web browser 108.

A local utility at a client computer receives a first request originating from an application and including a first token (702), wherein the application received a web page including a plurality of links and the first token from a first server. The plurality of links were received by the application from a second server.

In some embodiments, the local utility is software that is stored and executed by the client computer. In some embodiments, the application is any application that is capable of displaying and/or rendering information received from remote server, such as the web browser 108.

In some embodiments, the web page is coded in hypertext markup language (http), and/or other types, standards, or styles of programming languages, scripts, executable functions, etc. In some embodiments, the plurality of links and the first token are in a module within the web page. In some embodiments, the module is an iframe. As described above, the plurality of links may be uniform resource locators (URLs), and may specify any appropriate protocol, including hypertext transfer protocol, or hypertext transfer protocol secure. In some embodiments, one or more of the plurality of links are associated with a domain that resolves to a loopback network address (e.g., 127.0.0.1, *.loopdomain.com, etc.).

In some embodiments, the web page includes one or more local utility control elements each associated with one or more of the plurality of links. Examples of local utility control elements are described above. In some embodiments, the local utility control elements are selectable by a user (e.g., control buttons); in some embodiments, they are not selectable, and they only provide status information or other output to the user (e.g., status windows). In embodiments where the local utility is a media player, the local utility control elements may be media player control elements, and may cause the local utility to perform one or more of: playing a media file, stopping a media file, pausing a media file, fast forwarding a media file, rewinding a media file, skipping a media file, changing a playback order of a playlist, adding a media file to a playlist, purchasing a media file, adding a media file to a local library, and removing a media file from a playlist.

In some embodiments, the local utility is a media player capable of storing, playing, and/or editing media such as music and/or video. In some embodiments, the local utility is a download manager. In some embodiments, the local utility includes a web server (e.g., local web server 112) that is coupled with and communicates with the local utility. In some embodiments, the first request including the first token is received at the web server, which passes the first token to the local utility.

Returning to FIG. 7, the method 700 further includes authenticating the first token, including sending the first token to a third server (706). In some embodiments, authenticating the first token includes sending the first token from the local utility to a third server (707), and receiving, at the local utility, an authentication message from the third server (708). In some embodiments, the authentication message indicates that the first token was issued by the second server. In some embodiments, the first token is sent to the third server from the local utility.

The method 700 further includes, in response to authenticating the first token, generating a second token at the local utility (710). The second token is sent to the application for inclusion in subsequent requests from the application (712). In some embodiments, the second token is sent to the application by a local web server of the local utility.

In some embodiments, the method includes receiving a second request including a third token (714). In some embodiments, the second request is sent from the application (e.g., the web browser 108), and received by the local utility (e.g., the local utility 110 and/or the local web server 112). In some embodiments, the second request is an html request that includes the third token and either one or more local utility control commands, one or more local utility status request, or any combination thereof. In some embodiments, the request is a character string that is recognizable by the local utility and/or the local web server, and causes the local utility and/or the web server to take some action. In some embodiments, the payload is a file or other data structure.

In some embodiments, the method includes verifying that the third token matches the second token (716). If the second and third tokens match, one or more actions based on the content of the second request are taken (718). If the second and third tokens do not match, no action based on the content of the second request is taken (720). By verifying that the third token matches the second token (i.e., is the same token), the local utility verifies that the second request was issued by the same module that was previously authenticated using the first token (as described above with reference to FIG. 5).

The method 700 may include receiving a first request and a second request. In some embodiments, at least one of the first request or the second request are sent to the local utility, from the application, in response to executing one of the plurality of links at the application. For example, either or both of the first and second requests may be sent by the application in response to a user selection of a control element associated with a link, or in response to an application (e.g., the web browser) executing the link in conjunction with processing, displaying, or rendering the web page.

In embodiments where the executed link is user selectable, the application may receive a user selection of the link prior to executing the link, and send the at least one first request or second request from the application to the local utility in response to the user selection. In some embodiments, the user selects the link by selecting one of the local utility controls, as described above. In embodiments where the executed link is not user selectable, the client computer may process the web page, and send the at least one first request or second request from the application to the local utility in response to the processing of the web page.

Figure 8:
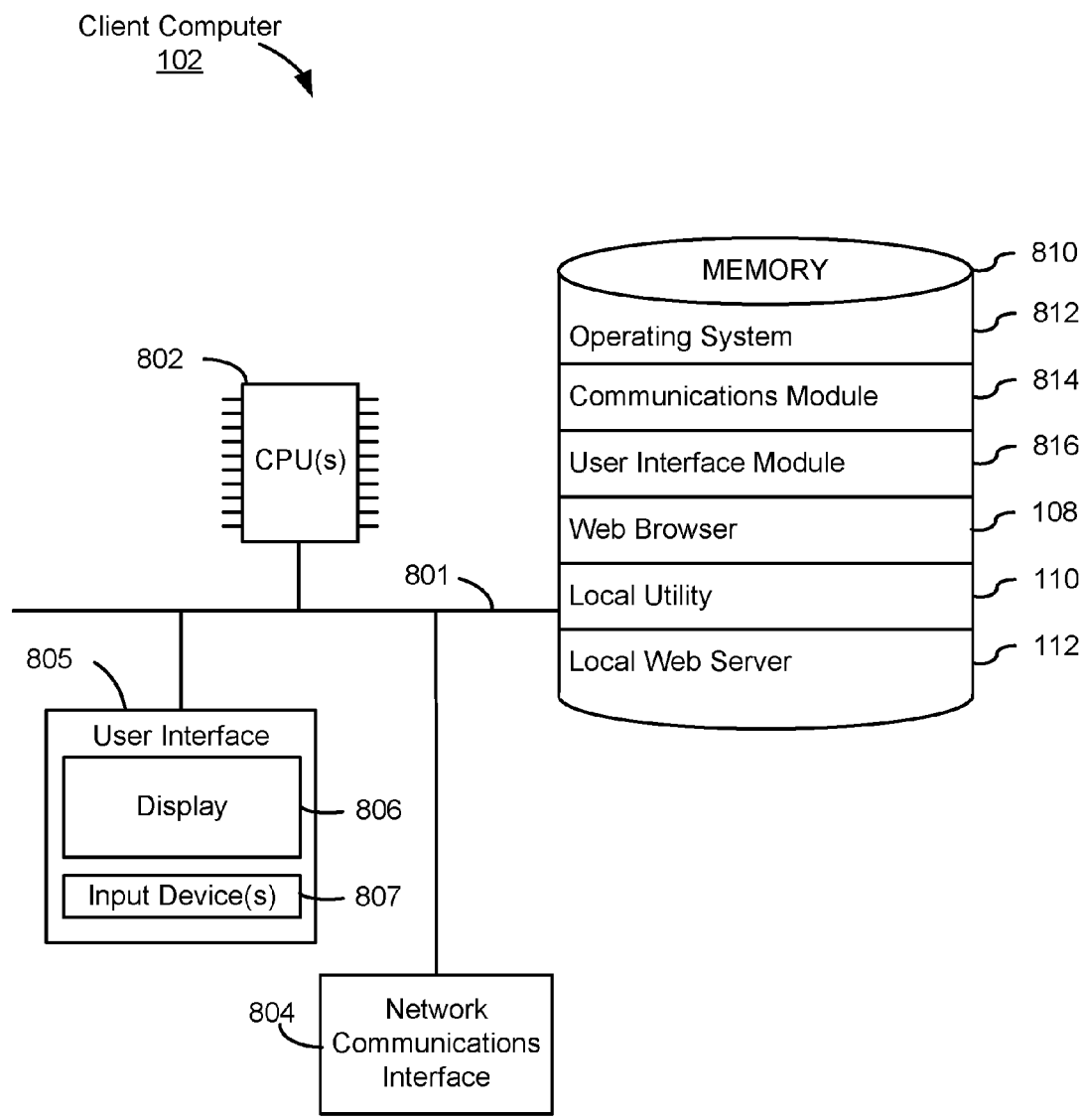
FIG. 8 is a block diagram illustrating a client computer system, according to some embodiments.

FIG. 8 is a block diagram illustrating a client computer 102, according to some implementations. The client computer 102 typically includes one or more processing units (CPUs, sometimes called processors) 802 for executing programs (e.g., programs stored in memory 810), one or more network or other communications interfaces 804, user interface 805, memory 810, and one or more communication buses 801 for interconnecting these components. The communication buses 801 may include circuitry (sometimes called a chipset) that interconnects and controls communications between system components. In some embodiments, the user interface 805 comprises a display 806 and input device(s) 807 (e.g., keyboard, mouse, touchscreen, keypads, etc.).

Memory 810 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 810 optionally includes one or more storage devices remotely located from the CPU(s) 802. Memory 810, or alternately the non-volatile memory devices(s) within memory 810, comprises a non-transitory computer readable storage medium. In some implementations, memory 810 or the computer readable storage medium of memory 810 stores the following programs, modules, and data structures, or a subset thereof:

- an operating system 812 that includes procedures for handling various basic system services and for performing hardware dependent tasks;
- a communications module 814 that is used for connecting the client computer 102 to other computers (e.g., the web server 104, the module server 122, the token server 502, and/or the DNS server 114) via the one or more communication interfaces 804 (wired or wireless) and one or more communication networks 106, such as the Internet, other wide area networks, local area networks, metropolitan area networks, and so on;
- a user interface module 816 that receives commands from the user via the input device(s) 807 and generates user interface objects in the display device 806;
- a web browser 108 that receives and displays information resources, and is configured to communicate with web servers (e.g., the web server 104, the module server 122, the DNS server 114, and/or the local web server 112);
- a local utility 110 that provides one or more computer-based functions to a user; and
- a local web server 112 that communicates with the local utility 110 and/or other sources, such as the web browser 108.

In some embodiments, the web browser 108 is any program, software, or application that is capable of receiving and/or displaying an information resource. In some embodiments, an information resource is a web page. In some embodiments, the web page is written in or includes hypertext markup language, although web pages may include or be written in additional and/or different languages as well.

In some embodiments, the local utility 110 is any program, software, or application that provides one or more computer-based functions to a user. In some embodiments, the local utility is a media player. In some embodiments, the local utility is a download manager. In some embodiments, the local utility is camera or printer control software. In some embodiments, the local utility is a media editor. The local utility 110 may communicate with the local web server 112, as well as other computers, servers, and systems, such as the web server 104, the module server 122, the token server 502, and the authentication module 504, among others.

In some embodiments, the local web server 112 receives information from the web browser 108, and passes the information to the local utility 110. Information that is received from the web browser 108 is described above. In some embodiments, the information is one or more http requests.

In some implementations, the programs or modules identified above correspond to sets of instructions for performing a function or method described above, including those described with reference to FIGS. 1-6. The sets of instructions can be executed by one or more processors (e.g., the CPUs 802). The above identified modules or programs (i.e., sets of instructions) need not be implemented as separate software programs, procedures, or modules, and thus various subsets of these programs or modules may be combined or otherwise re-arranged in various implementations. In some implementations, memory 810 stores a subset of the modules and data structures identified above. Furthermore, memory 810 may store additional modules and data structures not described above.

Figure 9:
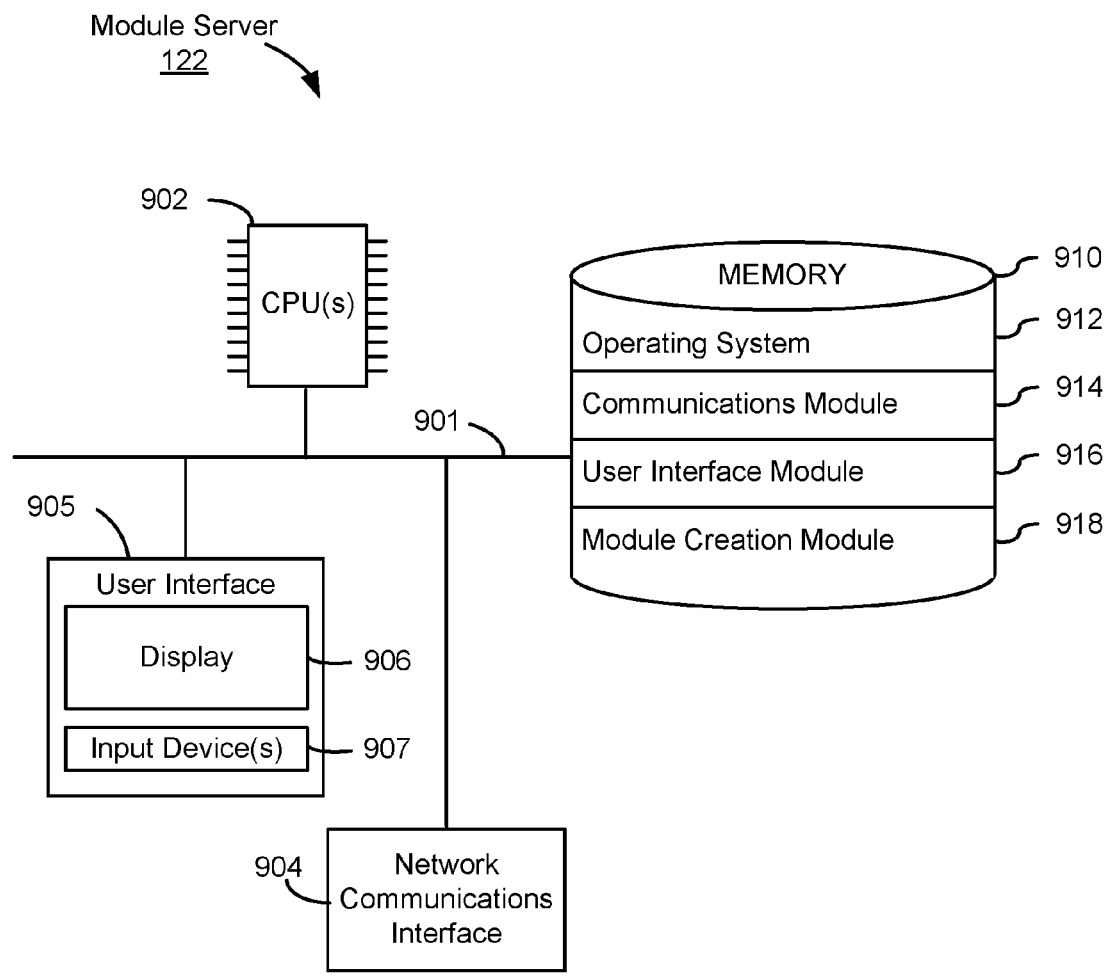
FIGS. 9-10 are a block diagrams illustrating server computer systems, according to some embodiments.

FIG. 9 is a block diagram illustrating a module server 122, according to some embodiments. The module server 122 typically includes one or more processing units (CPUs, sometimes called processors) 902 for executing programs (e.g., programs stored in memory 910), one or more network or other communications interfaces 904, an optional user interface 905, memory 910, and one or more communication buses 901 for interconnecting these components. The communication buses 901 may include circuitry (sometimes called a chipset) that interconnects and controls communications between system components. In some embodiments, the user interface 905 comprises a display 906 and input device(s) 907 (e.g., keyboard, mouse, touchscreen, keypads, etc.).

Memory 910 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 910 optionally includes one or more storage devices remotely located from the CPU(s) 902. Memory 910, or alternately the non-volatile memory devices(s) within memory 910, comprises a non-transitory computer readable storage medium. In some implementations, memory 910 or the computer readable storage medium of memory 910 stores the following programs, modules, and data structures, or a subset thereof:

- an operating system 912 that includes procedures for handling various basic system services and for performing hardware dependent tasks;
- a communications module 914 that is used for connecting the module server 122 to other computers (e.g., the client computer 102, the web server 104, the token server 502, and/or the DNS server 114) via the one or more communication interfaces 904 (wired or wireless) and one or more communication networks 106, such as the Internet, other wide area networks, local area networks, metropolitan area networks, and so on;
- an optional user interface module 916 that receives commands from the user via the input device(s) 907 and generates user interface objects in the display device 906; and
- a module creation module 918 that generates modules for inclusion into web pages.

In some embodiments, the module creation module 918 receives a specification for the contents of a module to be provided to a separate computer. For example, the module creation module 918 may receive a module specification from a web page creator or a web page itself (as described above). In some embodiments, the module is a media player widget, and the specification includes song identifiers, playlist identifiers, album identifiers, radio station identifiers, display parameters, and/or any other information.

In some embodiments, the module creation module 918 creates a module according to the specification, and stores the module in association with a module identifier. When the module is requested (e.g., by an http request including the module identifier), the module server 122 may send the stored module to the requesting device (e.g., the client computer 102).

In other embodiments, the module creation module 918 does not create and store a module upon receipt of the module specification, but rather assigns a module identifier to the specification. When the module is requested (e.g., by an http request including the module identifier), the module creation module 918 creates the module in real time, and sends the module to the requesting device (e.g., the client computer 102).

In some implementations, the programs or modules identified above correspond to sets instructions for performing a function or method described above, including those described with reference to FIGS. 1-6. The sets of instructions can be executed by one or more processors (e.g., the CPUs 902). The above identified modules or programs (i.e., sets of instructions) need not be implemented as separate software programs, procedures, or modules, and thus various subsets of these programs or modules may be combined or otherwise re-arranged in various implementations. In some implementations, memory 910 stores a subset of the modules and data structures identified above. Furthermore, memory 910 may store additional modules and data structures not described above.

Figure 10:
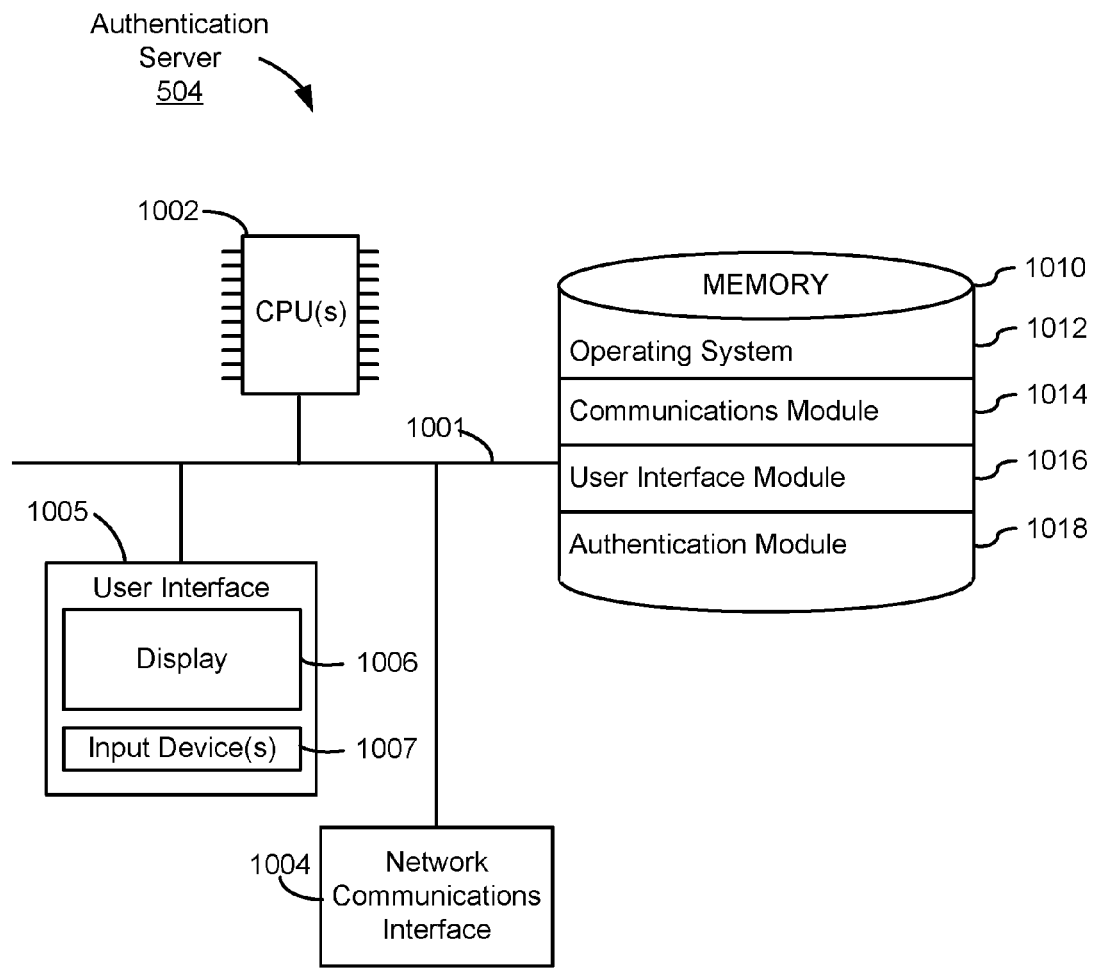

FIG. 10 is a block diagram illustrating an authentication server 504, according to some embodiments. The authentication server 504 typically includes one or more processing units (CPUs, sometimes called processors) 1002 for executing programs (e.g., programs stored in memory 1010), one or more network or other communications interfaces 1004, an optional user interface 1005, memory 1010, and one or more communication buses 1001 for interconnecting these components. The communication buses 1001 may include circuitry (sometimes called a chipset) that interconnects and controls communications between system components. In some embodiments, the user interface 1005 comprises a display 1006 and input device(s) 1007 (e.g., keyboard, mouse, touchscreen, keypads, etc.).

Memory 1010 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 1010 optionally includes one or more storage devices remotely located from the CPU(s) 1002. Memory 1010, or alternately the non-volatile memory devices(s) within memory 1010, comprises a non-transitory computer readable storage medium. In some implementations, memory 1010 or the computer readable storage medium of memory 1010 stores the following programs, modules, and data structures, or a subset thereof:

an operating system 1012 that includes procedures for handling various basic system services and for performing hardware dependent tasks;

a communications module 1014 that is used for connecting the authentication server 504 to other computers (e.g., the client computer 102, the web server 104, the token server 502, and/or the DNS server 114) via the one or more communication interfaces 1004 (wired or wireless) and one or more communication networks 106, such as the Internet, other wide area networks, local area networks, metropolitan area networks, and so on;

an optional user interface module 1016 that receives commands from the user via the input device(s) 1007 and generates user interface objects in the display device 1006; and an authentication module 1018 that authenticates communications and/or tokens.

In some embodiments, the authentication module 1018 confirms whether a communication should be trusted based on information contained in the communication. In some embodiments, the authentication module 1018 receives a request to authenticate a communication, where the request includes a token. In some embodiments, the authentication module 1018 determines whether the token is authentic (e.g., whether the token was previously issued in order to authenticate one or more communications), and sends a return message to the requesting device indicating whether or not the token is authentic. Some of the functions that may be provided by the authentication server 504 are described in more detail above with reference to FIG. 5.

In some implementations, the programs or modules identified above correspond to sets instructions for performing a function or method described above, including those described with reference to FIGS. 1-6. The sets of instructions can be executed by one or more processors (e.g., the CPUs 1002). The above identified modules or programs (i.e., sets of instructions) need not be implemented as separate software programs, procedures, or modules, and thus various subsets of these programs or modules may be combined or otherwise re-arranged in various implementations. In some implementations, memory 1010 stores a subset of the modules and data structures identified above. Furthermore, memory 1010 may store additional modules and data structures not described above.

Although FIGS. 8-10 show client and server computers, these Figures are intended more as functional descriptions of the various features which may be present in these computers than as structural schematics of the implementations described herein. In practice, and as recognized by those of ordinary skill in the art, items shown separately could be combined and some items could be separated. For example, some items shown separately in FIGS. 8-10 could be implemented in single modules or data structures.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementations. In general, structures and functionality presented as separate components in the example configurations may be implemented as a combined structure or component. Similarly, structures and functionality presented as a single component may be implemented as separate components. These and other variations, modifications, additions, and improvements fall within the scope of the described implementations.

The foregoing description, for purpose of explanation, has been described with reference to specific embodiments. However, the illustrative discussions above are not intended to be exhaustive or to limit the disclosed ideas to the precise forms disclosed. Many modifications and variations are possible in view of the above teachings. The embodiments were chosen and described in order to best explain the principles and practical applications of the disclosed ideas, to thereby enable others skilled in the art to best utilize them in various embodiments with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

It will also be understood that, although the terms "first," "second," etc. may be used herein to describe various elements, these elements should not be limited by these terms. These terms are only used to distinguish one element from another. For example, a first server could be termed a second server, and, similarly, a second server could be termed a first server, without changing the meaning of the description, so long as all occurrences of the "first server" are renamed consistently and all occurrences of the "second server" are renamed consistently.

Further, the terminology used herein is for the purpose of describing particular embodiments only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Finally, as used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

What is claimed is:

1. A computer-implemented method for controlling a local utility comprising:
   at a client computer having a processor and memory storing instructions for execution by the processor:
      at a web browser displaying two or more controls for a local utility executed on the client computer, wherein the two or more controls include respective links that include a domain that resolves to a loopback network address, wherein the loopback network address is a self-referencing address for a local web server at the client computer, and the local utility is distinct from the web browser:
         receiving a user input selecting a control of the two or more controls; and
         in response to the user input, issuing a request through a respective link of the selected control to the local web server at the client computer, the local web server coupled with the local utility;
      at the local web server:
         receiving, from the web browser, the request; and
         providing the local utility with a command portion of the request; and
      at the local utility coupled with the local web server:
         in response to receiving the command portion of the request from the local web server, taking one or more actions based on the command portion of the request, including performing one or more of:
            playing a media file;
            stopping a media file;
            pausing a media file;
            fast forwarding a media file;
            rewinding a media file;
            skipping a media file;
            changing a playback order of a playlist;
            adding a media file to a playlist; and
            removing a media file from a playlist.

2. The computer-implemented method of claim 1, wherein the web browser includes a module that contains the two or more controls for the local utility.

3. The computer-implemented method of claim 2, wherein the module is included in an inline frame in a web page.

4. The computer-implemented method of claim 1, wherein the respective link of the selected control is a uniform resource locator.

5. The computer-implemented method of claim 1, wherein the request issued from the web browser is an http request.

6. The computer-implemented method of claim 1, wherein the loopback network address is an IP address.

7. The computer-implemented method of claim 1, wherein a name of the domain is distinct from the loopback network address.

8. The computer-implemented method of claim 1, wherein:
   the domain is divided into multiple subdomains; and
   each subdomain is associated with the loopback network address.

9. The computer-implemented method of claim 1, wherein the respective link of the selected control specifies https protocol.

10. The computer-implemented method of claim 1, wherein the local web server and the local utility are part of the same software application.

11. A client computer, comprising:
    one or more processors; and
    memory storing two or more programs including a local utility and a web browser distinct from the local utility, wherein the two or more programs are stored in the memory and configured to be executed by the one or more processors, the two or more programs including instructions for:
       at the web browser:
          displaying two or more controls for the local utility, wherein the two or more controls include respective links that include a domain that resolves to a loopback network address, wherein the loopback network address is a self-referencing address for a local web server at the client computer;

receiving a user input selecting a control of the two or more controls; and in response to the user input, issuing a request through a respective link of the selected control to the local web server at the client computer, the local web server coupled with the local utility;

at the local web server:

receiving, from the web browser, the request; and providing the local utility with a command portion of the request; and at the local utility coupled with the local web server:

in response to receiving the command portion of the request from the local web server, taking one or more actions based on the command portion of the request, including performing one or more of:

playing a media file;
stopping a media file;
pausing a media file;
fast forwarding a media file;
rewinding a media file;
skipping a media file;
changing a playback order of a playlist;
adding a media file to a playlist; and
removing a media file from a playlist.

12. A non-transitory computer-readable storage medium storing one or more programs comprising instructions, executable by a client computer, for:

displaying, at a web browser, two or more controls for a local utility executed on the client computer, wherein the two or more controls include respective links that include a domain that resolves to a loopback network address, wherein the loopback network address is a self-referencing address for a local web server at the client computer, and the local utility is distinct from the web browser; and in response to a user input selecting a control of the two or more controls, issuing a request through a respective link of the selected control to the local web server at the client computer, the local web server coupled with the local utility, wherein:

the request comprises a command portion to instruct the local utility to take one or more actions, including performing one or more of:

playing a media file;
stopping a media file;
pausing a media file;
fast forwarding a media file;
rewinding a media file;
skipping a media file;
changing a playback order of a playlist;
adding a media file to a playlist; and
removing a media file from a playlist.

\* \* \* \* \*